(12) United States Patent
Zuo et al.

(10) Patent No.: US 11,361,488 B2
(45) Date of Patent: Jun. 14, 2022

(54) IMAGE DISPLAY METHOD AND APPARATUS, AND STORAGE MEDIUM

(71) Applicant: TENCENT TECHNOLOGY (SHENZHEN) COMPANY LIMITED, Shenzhen (CN)

(72) Inventors: Hongtao Zuo, Shenzhen (CN); Haixiong Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/860,156

(22) Filed: Apr. 28, 2020

(65) Prior Publication Data
US 2020/0258279 A1    Aug. 13, 2020

Related U.S. Application Data

(63) Continuation of application No. PCT/CN2018/115549, filed on Nov. 15, 2018.

(30) Foreign Application Priority Data

Nov. 16, 2017    (CN) .......................... 201711137094.7

(51) Int. Cl.
G06T 11/60    (2006.01)
G06T 1/00    (2006.01)
G06T 11/00    (2006.01)

(52) U.S. Cl.
CPC ............ G06T 11/60 (2013.01); G06T 1/0021 (2013.01); G06T 11/001 (2013.01)

(58) Field of Classification Search
None
See application file for complete search history.

(56) References Cited

U.S. PATENT DOCUMENTS

2004/0145599 A1* 7/2004 Taoka ...................... G09G 5/28
                                                        345/698
2012/0013800 A1    1/2012 Lee et al.
(Continued)

FOREIGN PATENT DOCUMENTS

CA         2820461 A1    6/2012
CN       101668144 A      3/2010
(Continued)

OTHER PUBLICATIONS

The State intellectual Property Office of the People's Repulic of China (SIPO) Office Action 1 for 201711137094.7, Feb. 10, 2021 9 Pages (including translation).

(Continued)

Primary Examiner — Aaron M Richer
(74) Attorney, Agent, or Firm — Anova Law Group, PLLC

(57) ABSTRACT

The present disclosure provides an image display method performed by the terminal device, including obtaining a to-be-processed image comprising a first image and a second image spliced together, pixels in the second image being in a one-to-one correspondence with pixels in the first image, and color data of each pixel in the second image representing a transparent attribute of the corresponding pixel in the first image; obtaining color data of each pixel in the first image and the color data of each pixel in the second image from the to-be-processed image; generating a third image according to the color data of each pixel in the first image and the second image; and displaying the third image.

18 Claims, 6 Drawing Sheets

(56) References Cited

U.S. PATENT DOCUMENTS

| | | | |
|---|---|---|---|
| 2012/0050309 A1* | 3/2012 | Tsuchida | G09G 5/377 345/592 |
| 2013/0229419 A1* | 9/2013 | Harris | G06T 1/60 345/501 |
| 2015/0195479 A1* | 7/2015 | Sano | G03B 21/147 348/745 |
| 2016/0241836 A1* | 8/2016 | Cole | H04N 13/189 |
| 2016/0275661 A1 | 9/2016 | Goard et al. | |
| 2017/0244908 A1* | 8/2017 | Flack | G06K 9/00234 |
| 2017/0287200 A1* | 10/2017 | Forutanpour | G06T 1/20 |
| 2019/0379856 A1* | 12/2019 | Hur | H04N 5/23238 |
| 2019/0379876 A1* | 12/2019 | Hur | H04N 21/4884 |

FOREIGN PATENT DOCUMENTS

| | | |
|---|---|---|
| CN | 102572304 A | 7/2012 |
| CN | 104077100 A | 10/2014 |
| CN | 104658030 A | 5/2015 |
| CN | 105574920 A | 5/2016 |
| CN | 106296623 A | 1/2017 |

OTHER PUBLICATIONS

Xiaodong Shao, "Creator Modeling art," Xidian University Press, Apr. 30, 2014 (Apr. 30, 2014), pp. 226-228. 7 pages.
The World Intellectual Property Organization (WIPO) International Search Report for PCT/CN2018/115549 dated Jan. 30, 2019 5 Pages (including translation).

\* cited by examiner

IMAGE DISPLAY METHOD AND APPARATUS, AND STORAGE MEDIUM

RELATED APPLICATIONS

This application claims priority to PCT Application No. PCT/CN2018/115549, filed on Nov. 15, 2018, which claims priority to Chinese Patent Application No. 201711137094.7, entitled "IMAGE DISPLAY METHOD AND APPARATUS, AND STORAGE MEDIUM," filed with the National Intellectual Property Administration on Nov. 16, 2017, which are both incorporated by reference in their entirety.

FIELD OF THE TECHNOLOGY

This application relates to the field of video playing technologies, and in particular, to an image display method and apparatus, and a computer storage medium.

BACKGROUND OF THE DISCLOSURE

With fierce competition in the video industry, each video platform needs to launch its own personalized service. For example, some video platforms display a logo picture on an upper layer of a video image being played, intending to display a dynamic advertisement on the upper layer of the video image being played to form a dynamic watermark on an upper layer of a static image, or the like. To implement personalized video services, a solution for achieving an overlapping display effect of at least two layers of images is desirable.

SUMMARY

Embodiments of this application provide an image display method and apparatus, and a storage medium, to achieve an overlapping display effect of at least two layers of images.

An embodiment of this application provides an image display method, performed by a terminal device. The method includes obtaining a to-be-processed image, the to-be-processed image comprising a first image and a second image spliced together, pixels in the second image being in a one-to-one correspondence with pixels in the first image, and color data of each pixel in the second image representing a transparent attribute of the corresponding pixel in the first image; obtaining color data of each pixel in the first image and the color data of each pixel in the second image from the to-be-processed image; generating a third image according to the color data of each pixel in the first image and the second image, pixels in the third image being in a one-to-one correspondence with the pixels in the first image, and color data of each pixel in the third image being based on the color data of the corresponding pixel in the first image and the color data of the corresponding pixel in the second image; and displaying the third image.

An embodiment of this application provides an image processing and display method, performed by a server. The method includes determining a transparent attribute of each pixel in a first image; generating a second image according to the transparent attribute of each pixel in the first image, pixels in the second image being in a one-to-one correspondence with pixels in the first image, and color data of each pixel in the second image representing a transparent attribute of the corresponding pixel in the first image; and generating a to-be-processed image including the first image and the second image spliced together.

An embodiment of this application provides a computer-readable storage medium, storing a computer program, and when executed by one or more processors, the computer program implements an image display method. The method includes obtaining a to-be-processed image, the to-be-processed image comprising a first image and a second image spliced together, pixels in the second image being in a one-to-one correspondence with pixels in the first image, and color data of each pixel in the second image representing a transparent attribute of the corresponding pixel in the first image; obtaining color data of each pixel in the first image and the color data of each pixel in the second image from the to-be-processed image; generating a third image according to the color data of each pixel in the first image and the second image, pixels in the third image being in a one-to-one correspondence with the pixels in the first image, and color data of each pixel in the third image being based on the color data of the corresponding pixel in the first image and the color data of the corresponding pixel in the second image; and displaying the third image.

Based on the foregoing technical solutions, the color data of each pixel in the first image and the color data of each pixel in the second image are obtained from the to-be-processed image. The third image is generated according to the color data of the two images. Because the color data of the pixel in the second image represents the transparent attribute of the corresponding pixel in the first image, each pixel in the generated third image carries the transparent attribute. Accordingly, some areas in the displayed third image are transparent, and some areas are opaque. Further, other images can be overlaid on a lower layer of the third image. That is, the overlapping display effect of the two layers of images can be achieved. Accordingly, a plurality of layers of different third images may also be displayed by using the foregoing method, and different third images may have different transparent areas. The other images may be displayed on the lower layer of all the third images, so that the overlapping display effect of more than two layers of images can be achieved.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

FIG. 3b is a schematic diagram of a second image corresponding to FIG. 3a.

DESCRIPTION OF EMBODIMENTS

Figure 1:
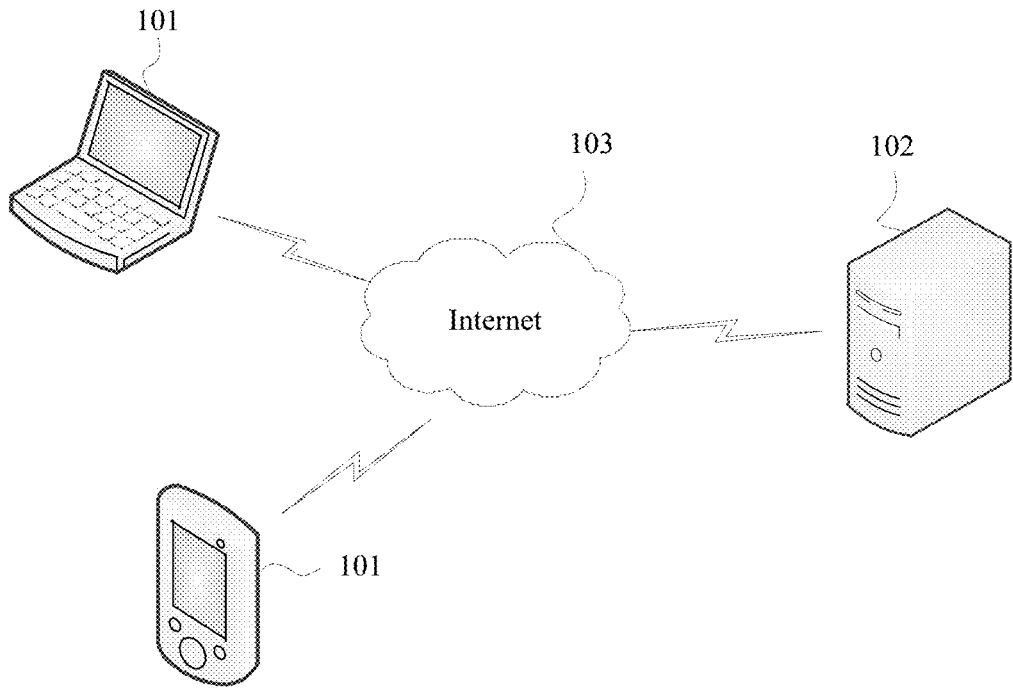
FIG. 1 is a structural block diagram of a system architecture in one embodiment of the present disclosure.

The present application provides an image display method. A system architecture to which the method is applicable is shown in FIG. 1. The system architecture includes a client device 101 and a server 102, the client device 101 and the server 102 being connected through a communications network 103.

The client device 101 may be a smartphone or a computer of a user, on which client software of various application software is installed. A user may log in to and use clients of various application software by using the client device, and the clients of the application software may include a video client.

The server 102 may be a server, or may be a server cluster that corresponds to the client installed on the client device 101, and may provide a corresponding service for the client device. For example, the server 102 may be a video server that provides a video service to the video client.

The communications network 103 may be a local area network (LAN), a metropolitan area network (MAN), a wide area network (WAN), a mobile network, a wired network or a wireless network, a dedicated network, or the like.

Figure 2:
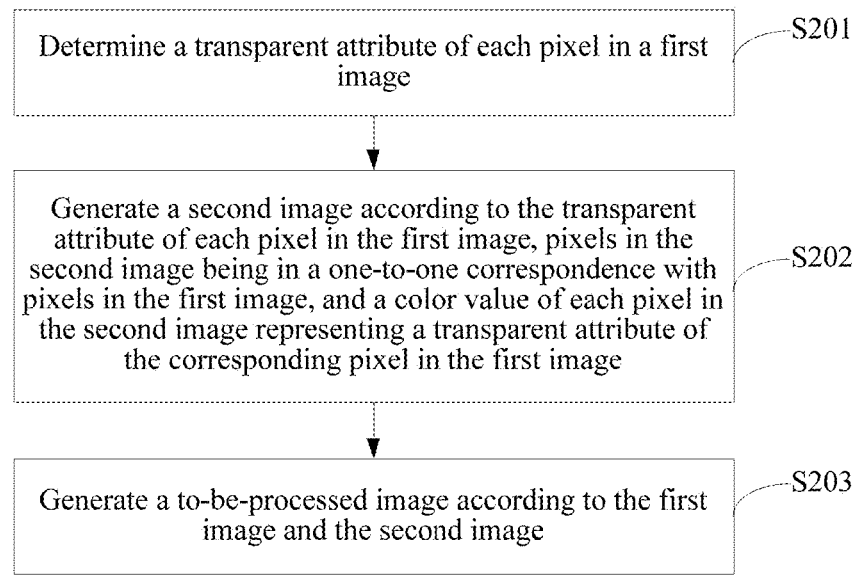
FIG. 2 is a schematic flowchart of an image display method in one embodiment of the present disclosure.

The image display method provided in this application may be performed by the server 102. As shown in FIG. 2, the method includes the following operations.

S201. Determine a transparent attribute of each pixel in a first image.

The first image may be a static image, or may be a dynamic image, namely, an image in a video stream, for example, a dynamic logo on an upper right side of a video playing interface in a video client, or for another example, a dynamic advertisement displayed on a client.

The transparent attribute, including a transparent state and a non-transparent state, may be further subdivided. For example, the transparent attribute may be divided into a completely transparent state, a semi-transparent state, or the like according to the degree of the transparent state.

When determining the transparent attribute of each pixel, which areas in the first image need to be set to the transparent state, which areas need to be set to the non-transparent state, and even which areas need to be set to the semi-transparent state may be analyzed according to the content of the first image. For the areas that need to be set to the transparent state, a transparent attribute of pixels may be set to be transparent. For the areas that need to be set to a non-transparent state, a transparent attribute of pixels may be set to one of the non-transparent state. For example, if a first image includes a logo that needs to be displayed. The pixels in the area displaying the logo may be set to a non-transparent state. The pixels in other areas not displaying the logo may be set to a transparent state.

S202. Generate a second image according to the transparent attribute of each pixel in the first image, pixels in the second image being in a one-to-one correspondence with pixels in the first image, and a color value of each pixel in the second image representing a transparent attribute of the corresponding pixel in the first image.

Because the pixels in the second image are in a one-to-one correspondence with the pixels in the first image, for example, the second image is set to the same size and resolution as the first image, a pixel of an $i^{th}$ row and a $j^{th}$ column in the second image corresponds to a pixel of an $i^{th}$ row and a $j^{th}$ column in the first image.

The color value of each pixel in the second image represents the transparent attribute of the corresponding pixel in the first image. If the transparent attribute of any pixel in the first image includes only transparency and non-transparency, the color value of any pixel in the second image has only two values. One value represents that the transparent attribute of the corresponding pixel in the first image is transparent, and the other value represents that the transparent attribute of the corresponding pixel in the first image is non-transparent.

For example, if a pixel of an $i1^{th}$ row and a $j1^{th}$ column in the first image needs to be set to be transparent, a color value of a pixel of the $i1^{th}$ row and the $j1^{th}$ column in the second image may be set to 0, so that the pixel of the $i1^{th}$ row and the $j1^{th}$ column in the second image is black. For another example, if a pixel of an $i2^{th}$ row and a $j2^{th}$ column in the first image needs to be set to be non-transparent, a color value of a pixel of the $i2^{th}$ row and the $j2^{th}$ column in the second image may be set to 1, so that the pixel of the $i2^{th}$ row and the $j2^{th}$ column in the second image is white.

Figure 3A:
FIG. 3a is a schematic diagram of a first image in one embodiment of the present disclosure.
Figure 3B:

FIG. 3a is a first image. FIG. 3b is a corresponding second image. For the areas in FIG. 3a that need to be set to be transparent, corresponding areas in FIG. 3b are set to be black. That is, a color value of pixels is 0. For the areas in FIG. 3a that need to be set to be non-transparent, corresponding areas in FIG. 3b are set to be white. That is, a color value of pixels is 1.

S203. Generate a to-be-processed image according to the first image and the second image.

Figure 3C:
FIG. 3c is a schematic diagram of a to-be-processed image formed in FIG. 3a and FIG. 3b.

The to-be-processed image is created according to the first image and the second image, and this may be specifically implemented by a splicing the first and second images together. For example, the first image and the second image are spliced side by side, or are spliced up and down to form an image, so that image data of the first image and corresponding second image may be obtained together when the image data is obtained subsequently. For example, FIG. 3c is the to-be-processed image generated by splicing FIG. 3a and FIG. 3b.

The image display method provided in embodiments consistent with the present disclosure is the process in which the server 102 encodes. The operations S201 to S203 are performed on the image of which some areas need to be transparently processed, to subsequently obtain and process by the client device 101 or other devices, so that some areas of the image displayed on the client device or the other devices are transparent, some areas are non-transparent, and other images are further arranged on a lower layer of the image, thereby achieving the overlapping display effect of the plurality of layers of images.

Embodiments consistent with the present disclosure further provide an image display method that may be performed by the client device 101. The method may be specifically performed by the client (for example, a video player) in the client device 101. The image display method may also be performed by an H5 page on a terminal device, or the like. Because the client device is also a terminal device, an execution body of the image display method may be summarized as the terminal device.

Figure 4:
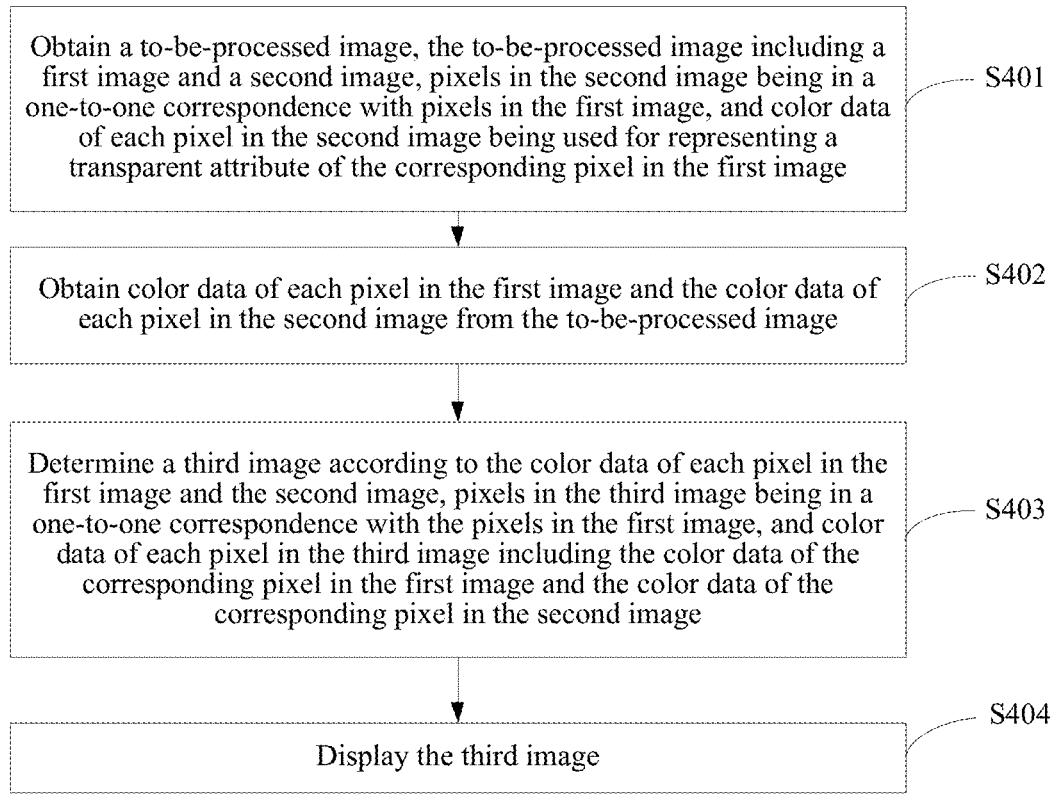
FIG. 4 is a schematic flowchart of an image display method in one embodiment of the present disclosure.

When the image display method is performed by the H5 page on the terminal device, the data transmission process between the terminal device and the server is similar to the data transmission process between the client device and the server when the image display method is performed by the client device. The image display method is described below by using an example in which the image display method is performed by the client device. As shown in FIG. 4, the method includes the following operations.

S401. Obtain a to-be-processed image, the to-be-processed image including a first image and a second image, pixels in the second image being in a one-to-one correspondence with pixels in the first image, and color data of each pixel in the second image being used for representing a transparent attribute of the corresponding pixel in the first image.

The first image, for example, is FIG. 3a. The second image, for example, is FIG. 3b. The to-be-processed image, for example, is FIG. 3c.

The process of obtaining the to-be-processed image includes the process of obtaining image data of the to-be-processed image.

In this operation, obtaining the to-be-processed image refers to obtaining the to-be-processed image from the server 102, and the specific obtaining process may include the following operations.

S4011. Receive a data stream corresponding to the to-be-processed image from a server.

Because the image data of the to-be-processed image is stored on the server 102, the client device 101 may transmit an obtaining instruction to the server 102. When receiving the instruction, the server 102 transmits the data stream of the to-be-processed image to the client device 101. The client device 101 may further obtain the data stream of the to-be-processed image from the server 102 by other methods.

S4012. Decode the data stream to obtain decoded data.

Decoding the data stream may be software decoding, or may be hardware decoding. The software decoding refers to decoding by a code having a decoding function, or decoding by a decoder installed on the client device 101, for example, a decoder built in a mobile phone chip. The methods of encoding and/or decoding are not limited in this example of this application.

S4013. Draw the decoded data to a preset surface texture layer.

The surface texture layer may also be referred to as SurfaceTexture. The layer is equivalent to an intermediate layer between a decoding layer and a display layer, and a purpose of drawing the decoded data to the intermediate layer is not to directly display, thereby facilitating subsequent processing.

The to-be-processed image may be displayed by adding the decoded data to the surface texture layer.

S4014. Obtain texture data from the surface texture layer, and use the texture data as image data of the to-be-processed image.

The decoded data obtained from the surface texture layer includes the image data of the to-be-processed image. After the image data is obtained from the surface texture layer, the subsequent operation may be performed.

S402. Obtain color data of each pixel in the first image and the color data of each pixel in the second image from the to-be-processed image.

As shown in FIG. 3a, because the first image is an original image, color is relatively rich, and the color of each pixel may be formed by combining components of a plurality of color channels, the color data of each pixel in the first image may be components of all color channels. The color data may also use other forms of data. For example, the color of each pixel in the first image is jointly formed by three channels, namely, RGB. 16 million different colors may be obtained by combining values of red, green and blue from 0 to 255 by calculating 256×256×256. The 16 million different colors may be represented by a string of hexadecimal symbols. Therefore, color data of a pixel in the first image may be (R, G, B), or may be a string of hexadecimal symbols, provided that a color of the pixel can be represented.

As shown in FIG. 3b, because a color of the second image is relatively single, usually a grayscale image or a binary image, the color data for each pixel in the second image may be represented by 0 or 1. A representation of (R, G, B) or a string of hexadecimal symbols may also be used, but values of R, G, B are the same for the grayscale or the binary image.

The specific process of the obtaining color data of each pixel in the first image and the color data of each pixel in the second image may include the following operations.

S4021. Map the image data that is of the to-be-processed image and that is added to the surface texture layer to a preset range in a preset coordinate system.

Because sizes of different to-be-processed images are different, to facilitate data processing, uniformization may be performed. That is, the to-be-processed image is mapped to the preset range of the preset coordinate system.

Figure 5:
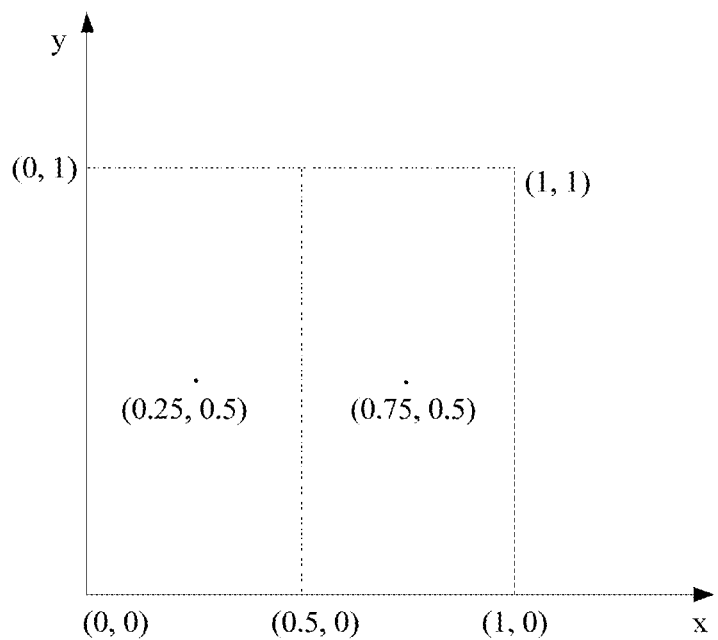
FIG. 5 is a schematic diagram of a preset range of a preset coordinate system in one embodiment of the present disclosure.

For example, as shown in FIG. 5, the to-be-processed image may be mapped to a square area having a horizontal coordinate in a range of [0, 1] and a vertical coordinate in the range of [0, 1]. If the first image and the second image are spliced side by side, and the first image is located on a left side of the second image, an area having a horizontal coordinate in a range of [0, 0.5] corresponds to the first image, and an area having a horizontal coordinate in a range of [0.5, 1] corresponds to the second image. That is, a left half part is an area obtained after the first image is mapped, and a right half part is an area obtained after the second image is mapped.

S4022. Determine position data of each pixel in the first image within the preset range, and use the position data as first position data.

Because the to-be-processed image is mapped from the surface texture layer to the preset range of the preset coordinate system, positions of the pixels in the to-be-processed image change, and therefore a position of each pixel needs to be determined. Because a relationship between the position of each pixel in the second image and the position of the corresponding pixel in the first image exists, the position of each pixel in the first image may first be determined, and then the position of the corresponding pixel in the second image may be determined according to the position. The position of each pixel in the first image may be determined according to a mapping relationship of the to-be-processed image from the surface texture layer to the preset range of the preset coordinate system, and a specific method for determining the position may use the following formula:

$$\text{textureCoordinateRGB} = \text{vec2}((\text{textureTransform} * v\text{TexCoordinate}).x, (\text{textureTransform} * v\text{TexCoordinate}).y),$$

where vTextCoordinate is a coordinate of the pixels in the first image in the surface texture layer, textureTransform is a transformation matrix for mapping of the to-be-processed image from the surface texture layer to the preset range in the preset coordinate system, and textureCoordinateRGB is a coordinate of the pixels in a first image that are mapped from the surface texture layer to the preset range in the preset coordinate system.

S4023. Determine position data of the corresponding pixel in the second image within the preset range according to the first position data, and use the position data as second position data.

When the first position data is determined, the second position data may be determined according to the first position data. The specific method for determining the second position is related to how the first image and the second image are spliced, and is also related to the preset range in the preset coordinate system. On the premise that a difference between a maximum horizontal coordinate and a minimum horizontal coordinate in the preset range is a, and a difference between a maximum vertical coordinate and a minimum vertical coordinate is b, several method of determining the second position are introduced as follows:

(1) If the first image and the second image are spliced side by side, and the first image is located on the left side of the second image, a method of determining the second position data according to the first position data is as follows:

A vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is a/2.

That is, the vertical coordinate is unchanged, and the horizontal coordinate is moved for a/2 to the right. For example, if a coordinate of a pixel of an $i^{th}$ row and a $j^{th}$ column in the first image within the preset range is (x1, y1), a coordinate of a pixel of an $i^{th}$ row and a $j^{th}$ column in the second image within the preset range is (x1+a/2, y1). As shown in FIG. 5, a pixel at a corresponding position (0.25, 0.5) in the first image corresponds to a pixel at a corresponding position (0.75, 0.5) in the second image.

(2) If the first image and the second image are spliced side by side, and the first image is located on a right side of the second image, a method of determining the second position data according to the first position data is as follows:

A vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is −a/2.

That is, the vertical coordinate is unchanged, and the horizontal coordinate is moved for −a/2 to the left. For example, if a coordinate of the pixel of an $i^{th}$ row and a $j^{th}$ column in the first image within the preset range is (x1, y1), a coordinate of a pixel of an $i^{th}$ row and a $j^{th}$ column in the second image within the preset range is (x1−a/2, y1).

(3) If the first image and the second image are spliced up and down, and the first image is located under the second image, a method of determining the second position data according to the first position data is as follows:

A horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is b/2.

That is, the horizontal coordinate is unchanged, and the vertical coordinate is moved for b/2 upwards. For example, if a coordinate of a pixel of an $i^{th}$ row and a $j^{th}$ column in the first image within the preset range is (x1, y1), a coordinate of a pixel of an $i^{th}$ row and a $j^{th}$ column in the second image within the preset range is (x1, y1+b/2).

(4) If the first image and the second image are spliced up and down, and the first image is located on the second image, a method of determining the second position data according to the first position data is as follows:

A horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is −b/2.

That is, the horizontal coordinate is unchanged, and the vertical coordinate is moved for b/2 upwards. For example, if a coordinate of a pixel of an $i^{th}$ row and a $j^{th}$ column in the first image within the preset range is (x1, y1), a coordinate of a pixel of an $i^{th}$ row and a $j^{th}$ column in the second image within the preset range is (x1, y1−b/2).

S4024. Obtain color data of each pixel in the first image from the preset range according to the first position data.

After the position of each pixel in the first image and the position of the corresponding pixel in the second pixel are determined, the color data of each pixel may be obtained. Specifically, a sampler may be used for obtaining the color data of each pixel in the first image from the preset range.

The sampler is specifically the following sampling formula:

$$Rgbcolor=texture2D(texture, textureCoordinateRGB)$$

Texture is a texture of the to-be-processed image mapped to the preset range of the preset coordinate system, textureCoordinateRGB is a coordinate of a pixel in the first image within the preset range, texture2D is the sampling formula, and Rgbcolor is the color data that is of each pixel in the first image and that is obtained by sampling. The color value may be represented by components of all color channels, for example, (R, G, B).

S4025. Obtain color data of each pixel in the second image from the preset range according to the second position data.

The sampler may also be used for obtaining the color data of each pixel in the second image from the preset range.

The sampler is specifically the following sampling formula:

$$Alphacolor=texture2D(texture, textureCoordinateAlpha)$$

TextureCoordinateAlpha is a coordinate of a pixel in the second image, alphacolor is color data that is of the pixel in the second image and that is obtained by sampling, and the color data of each pixel in the second image is used for representing the transparent attribute of the corresponding pixel in the first image.

S403. Determine a third image according to the color data of each pixel in the first image and the second image, pixels in the third image being in a one-to-one correspondence with the pixels in the first image, and color data of each pixel in the third image including the color data of the corresponding pixel in the first image and the color data of the corresponding pixel in the second image.

Because the color data of each pixel in the third image includes both the color data of the corresponding pixel in the first image and the color data of the corresponding pixel in the second image, and the color data of each pixel in the second image represents the transparent attribute of the corresponding pixel in the first image, the image data of the third image is actually the image data that carries the transparent attribute and that corresponds to the first image.

There are a plurality of specific forms of the color data, for example, a form of a vector is used for representation. If the color data is represented in the form of the vector, the color data may also be referred to as a color vector. Each pixel in the first image corresponds to one color vector. If there are n pixels in the first image, there are also n pixels in the third image. That is, the third image includes n color vectors. Therefore, the process of determining the third image may include: combining the components of all color channels of each pixel in the first image with a color value of the corresponding pixel in the second image to form a color vector corresponding to the pixel in the third image. For example, gl_FragColor=vec4 (Rgbcolor.r, Rgbcolor.g, Rgbcolor.b, alphacolor).

S404. Display the third image.

The third image is an image generated after the image data of the third image is displayed on a display interface. Some areas of the third image are transparent, and some areas are non-transparent, so that when a layer of the image is displayed on a lower layer of the third image, the lower layer of the image can be seen on the transparent part of the third image, thereby achieving a laminated display effect of a plurality of layers of images.

To display the third image, opengl may be used for rendering. A mixing function is used before opengl is used for rendering, and the mixing function may be used only by invoking glEnable (GL_BLEND) in an RGBA mode. Then, a transparent factor is set, where the transparent factor is related to alphacolor of each pixel and is used for representing whether the image uses the transparent attribute. Then, opengl is used for drawing to obtain the third image.

According to the image display method provided in the example of this application, the color data of each pixel in the first image and the color data of each pixel in the second image are obtained from the to-be-processed image. The third image is generated according to the color data of the two images. Because the color data of the pixel in the second image represents the transparent attribute of the corresponding pixel in the first image, each pixel in the third image carries the transparent attribute. Accordingly, some areas in the displayed third image are transparent, and some areas are opaque. Further, other images can be displayed on the lower layer of the third image. That is, the overlapping display effect of the two layers of images can be achieved. Moreover, a plurality of layers of different third images may also be displayed by using the foregoing method, and different third images may have different transparent areas. In some embodiments, the other images are displayed on the lower layer of all the third images, so that the overlapping display effect of more than two layers of images can be achieved.

During actual application, the image that is on the upper layer and that includes the transparent area may be a static picture, or may be a video. The image that is on the lower layer and that does not include the transparent area may be a static picture, or may be a video.

In some embodiments, after one or more layers of the images (that is, one or more layers of the third images) including transparent areas are displayed on the display interface by using the operations S401 to S404, the one or more layers of the images having transparent areas can be displayed in the display interface. A preset fourth image may further be obtained before, while, or after the one or more layers of the images including transparent areas are displayed, and the fourth image is displayed to the display interface, where the fourth image is located on the lower layer of the third image.

Figure 6A:
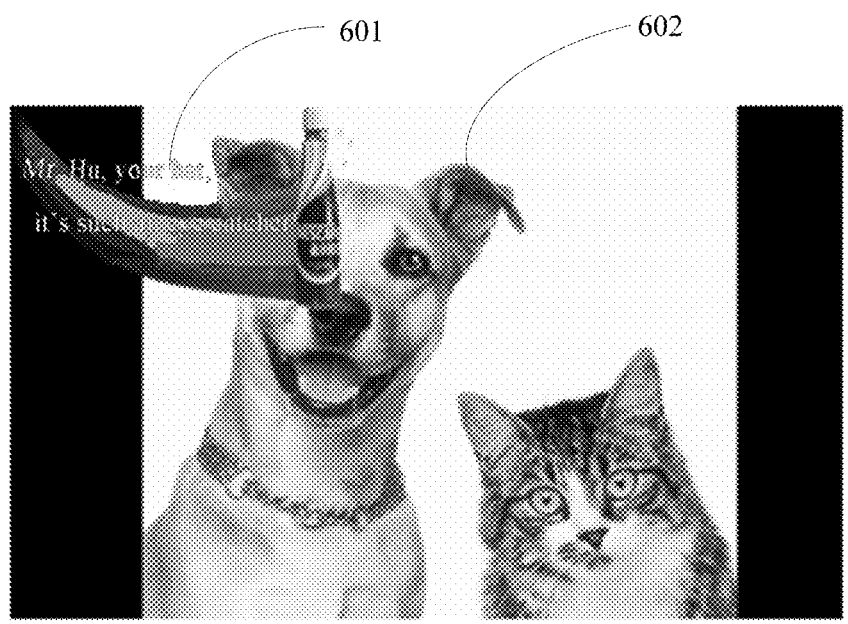
FIG. 6a is a display effect diagram of two layers of images in one embodiment of the present disclosure.

For example, a static picture is displayed on a lower layer of a dynamic advertisement. As shown in FIG. 6a, a current upper layer image 601 in FIG. 6a is a frame of image (the image being the third image corresponding to FIG. 3a) in the dynamic advertisement. It can be seen from the figure that some areas in the upper layer image 601 are transparent, so that a lower layer image 602 can be displayed, and some areas are non-transparent and block corresponding areas of the lower layer image 602, thereby reflecting the effect of overlapping the two layers.

Figure 6B:
FIG. 6b is a display effect diagram of two layers of images in one embodiment of the present disclosure.

For example, a segment of the video is displayed on a lower layer of a static logo. As shown in FIG. 6b, the upper layer image is a logo, and the lower layer is a frame of image in a segment of the video. It can be seen from the figure that an area of the logo in the image is non-transparent, and an area outside the logo is transparent, so that the video on the lower layer can be seen. In FIG. 6b, the logo is an identifier including the text "Tencent video" and a graphic in an elliptical area 603.

In some embodiments, a dynamic watermark may also be displayed on a publicity page for brand display and the like. The image display method provided in this application may further be applied to other application scenarios, which are not listed one by one herein.

The fourth image may also be not obtained after the plurality of layers of images including the transparent areas are displayed on the display interface, and the plurality of layers of images including the transparent areas are displayed only in the display interface.

Figure 7:
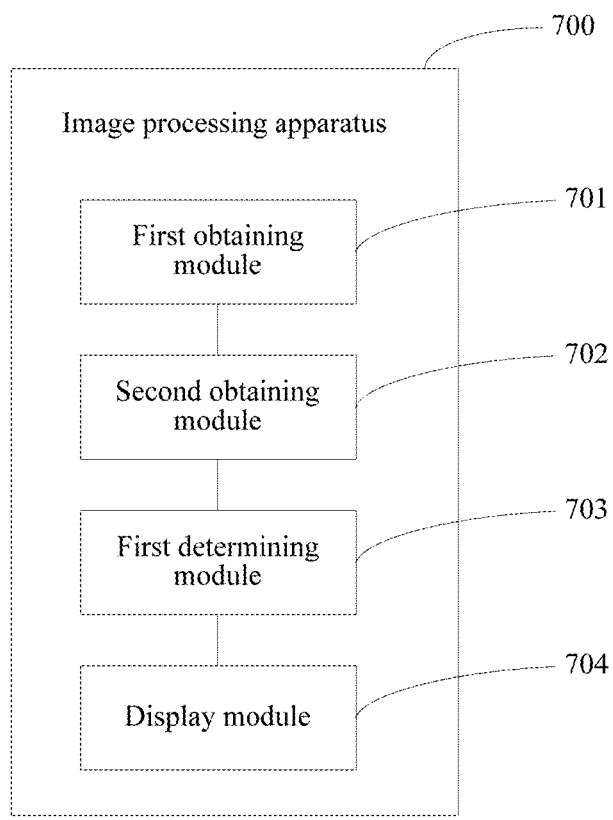
FIG. 7 is a structural block diagram of an image display apparatus in one embodiment of the present disclosure.

As shown in FIG. 7, embodiments consistent with the present disclosure further provide an image display apparatus 700. The apparatus 700 may be a client device, or the apparatus may include a client device, or the apparatus may be disposed on a client device. Because the image display method may be performed by a client on the client device, and may also be performed by an H5 page on a terminal device, a relationship between the terminal device and the image display apparatus is similar to a relationship between the client device and the display apparatus.

The image display apparatus includes: at least one memory (not shown in the figure); and at least one processor (not shown in the figure), the at least one memory storing at least one instruction module configured to be executed by the at least one processor.

The at least one instruction module includes: a first obtaining module 701, configured to obtain a to-be-processed image, the to-be-processed image including a first image and a second image, pixels in the second image being in a one-to-one correspondence with pixels in the first image, and color data of each pixel in the second image being used for representing a transparent attribute of the corresponding pixel in the first image; a second obtaining module 702, configured to obtain color data of each pixel in the first image and the color data of each pixel in the second image from the to-be-processed image; a first determining module 703, configured to determine a third image according to the color data of each pixel in the first image and the second image, pixels in the third image being in a one-to-one correspondence with the pixels in the first image, and color data of each pixel in the third image including the color data of the corresponding pixel in the first image and the color data of the corresponding pixel in the second image; and a display module 704, configured to display the third image.

In some embodiments, the first obtaining module is specifically configured to: receive a data stream corresponding to the to-be-processed image from a server; decode the data stream to obtain decoded data; draw the decoded data to a preset surface texture layer; and obtain texture data from the surface texture layer, and use the texture data as image data of the to-be-processed image.

In some embodiments, the second obtaining module specifically includes: a mapping unit, configured to map the image data that is of the to-be-processed image and that is overlaid to the surface texture layer to a preset range in a preset coordinate system; a first determining unit, configured to determine position data of each pixel in the first image within the preset range, and use the position data as first position data; a second determining unit, configured to determine position data of the corresponding pixel in the second image within the preset range according to the first position data, and use the position data as second position data; a first obtaining unit, configured to obtain color data of each pixel in the first image from the preset range according to the first position data; and a second obtaining unit, configured to obtain color data of each pixel in the second image from the preset range according to the second position data.

In some embodiments, a difference between a maximum horizontal coordinate and a minimum horizontal coordinate in the preset range is a, and a difference between a maximum vertical coordinate and a minimum vertical coordinate is b. The first image and the second image are spliced side by side, and the first image is located on a left side of the second image. The second determining unit specifically includes: a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is a/2.

In some embodiments, a difference between a maximum horizontal coordinate and a minimum horizontal coordinate in the preset range is a, and a difference between a maximum vertical coordinate and a minimum vertical coordinate is b. The first image and the second image are spliced side by side, and the first image is located on a right side of the second image. The second determining unit specifically includes: a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is −a/2.

In some embodiments, a difference between a maximum horizontal coordinate and a minimum horizontal coordinate in the preset range is a, and a difference between a maximum vertical coordinate and a minimum vertical coordinate is b. The first image and the second image are spliced up and down, and the first image is located under the second image. The second determining unit specifically includes: a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is b/2.

In some embodiments, a difference between a maximum horizontal coordinate and a minimum horizontal coordinate in the preset range is a, and a difference between a maximum vertical coordinate and a minimum vertical coordinate is b. The first image and the second image are spliced up and down, and the first image is located on the second image. The second determining unit specifically includes: a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is −b/2.

In some embodiments, the first obtaining unit is specifically configured to obtain the color data of each pixel in the first image from the preset range by using a sampler. The second obtaining unit is specifically configured to obtain the color data of each pixel in the second image from the preset range by using the sampler.

In some embodiments, the color data of each pixel in the first image is components of all color channels of the pixel. The color data of each pixel in the second image is a color value of the pixel, and the color data of each pixel in the third image is a color vector of the pixel. The first determining module is specifically configured to combine the components of all color channels of each pixel in the first image with a color value of the corresponding pixel in the second image to form a color vector of the corresponding pixel in the third image.

Based on the foregoing technical solutions, the image processing apparatus obtains the color data of each pixel in the first image and the color data of each pixel in the second image from the to-be-processed image, and then generates the third image according to the color data of the two images. Because the color data of the pixel in the second image represents the transparent attribute of the corresponding pixel in the first image, each pixel in the generated third image carries the transparent attribute. Accordingly, some areas in the displayed third image to be transparent, and some areas to be opaque. As such, other images can be displayed on a lower layer of the third image. That is, the overlapping display effect of the two layers of images can be achieved. In some embodiments, a plurality of layers of different third images may also be displayed by using the foregoing method, and different third images have different transparent areas. The other images are displayed on the lower layer of all the third images, so that the overlapping display effect of more than two layers of images can be achieved.

The image display apparatus provided in the embodiments consistent with the present disclosure corresponds to the image display method performed by the terminal device in the embodiments consistent with the present disclosure. For parts such as an explanation, an example, and a beneficial effect related to the content, reference may be made to corresponding parts of the foregoing content. Details are not described herein.

Figure 8:
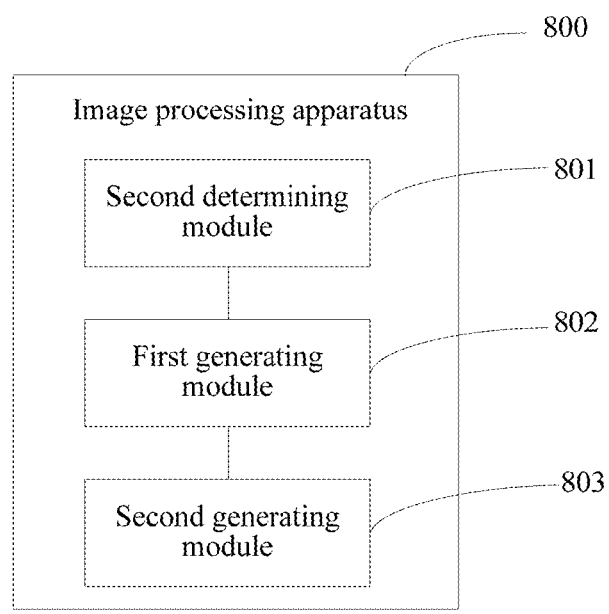
FIG. 8 is a structural block diagram of an image display apparatus in one embodiment of the present disclosure.

As shown in FIG. 8, embodiments consistent with the present disclosure further provide an image display apparatus 800. The apparatus 800 may be a server, or the apparatus may include a server, or the apparatus may be disposed on a server. The image display apparatus includes: at least one memory (not shown in the figure); and at least one processor (not shown in the figure), the at least one memory storing at least one instruction module configured to be executed by the at least one processor.

The at least one instruction module includes: a second determining module 801, configured to determine a transparent attribute of each pixel in a first image; a first generating module 802, configured to generate a second image according to the transparent attribute of each pixel in the first image, pixels in the second image being in a one-to-one correspondence with pixels in the first image, and a color value of each pixel in the second image representing a transparent attribute of the corresponding pixel in the first image; and a second generating module 803, configured to generate a to-be-processed image according to the first image and the second image.

In some embodiments, the second generating module is specifically configured to splice the first image and the second image to obtain the to-be-processed image.

The image display apparatus provided in embodiments consistent with the present disclosure includes the encoding process. The second determining module 801, the first generating module 802, and the second generating module 803 perform the operations on the image of which some areas need to be transparently processed, to subsequently obtain and process by the terminal device, so that some areas of the image displayed on the terminal device are transparent, some areas are non-transparent, and other images are further arranged on a lower layer of the image, thereby achieving the overlapping display effect of the plurality of layers of images.

The image display apparatus provided in the embodiments consistent with the present disclosure corresponds to the image display method performed by the server in the embodiments consistent with the present disclosure. For parts such as an explanation, an example, and a beneficial effect related to the content, reference may be made to corresponding parts of the foregoing content. Details are not repeated herein.

Embodiments consistent with the present disclosure further provide a storage medium, storing a computer program, and the operations of any one of the foregoing methods being implemented when the program is executed by a processor.

Figure 9:
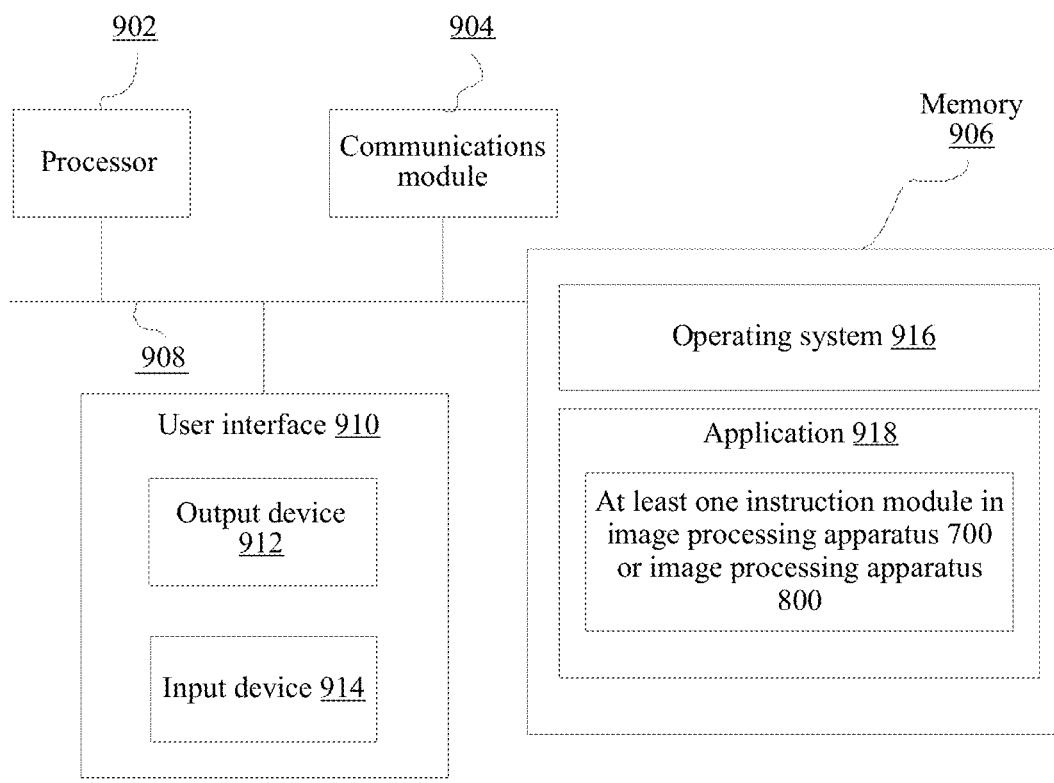
FIG. 9 is a structural block diagram of a computer device in one embodiment of the present disclosure.

Embodiments consistent with the present disclosure further provide a computer device. The device may be a server. As shown in FIG. 9, the computer device includes: one or more processors (CPU) 902, a communications module 904, a memory 906, a user interface 910, and a communications bus 908 configured to interconnect these components.

The processor 902 may transmit and receive data by using the communications module 904 to implement network communication and/or local communication.

The user interface 910 includes one or more output devices 912, including one or more speakers and/or one or more visual displays. The user interface 910 further includes one or more input devices 914, including a keyboard, a mouse, a sound command input unit or a microphone, a touch display, a touch-sensitive input panel, a posture capturing camera, another input button or control, or the like.

The memory 906 may be a high-speed random access memory such as a dynamic random access memory (DRAM), a static random-access memory (SRAM), a double data rate random-access memory (DDR RAM), or another random access solid-state storage device; or a non-volatile memory such as one or more magnetic storage devices, an optical disc storage device, a flash memory, or another non-volatile solid-state storage device.

The memory 906 stores an instruction set that can be performed by the memory 902, and includes: an operating system 916, including a program configured to process various basic system services and execute a hardware-related task; and an application 918, including various application programs, for example, configured to process an image. The application program can implement processing procedures of the foregoing examples, and may also include some or all of the instruction modules or units in the image display apparatus 700 or the image display apparatus 800. The processor 902 executes one or more machine-executable instructions in the memory 906, to implement functions of one or more modules in the foregoing units or modules.

Not all of the operations and modules in the foregoing processes and structural diagrams are necessary, and some operations or modules may be omitted according to actual needs. An execution sequence of the operations is not fixed and may be adjusted according to needs. Division of the modules is merely functional division for ease of description. During actual implementation, one module may be implemented separately by a plurality of modules, and functions of the plurality of modules may alternatively be implemented by the same module. The modules may be located in the same device, and may also be located in different devices.

The hardware modules in the embodiments of the present disclosure may be implemented by hardware components or by using a hardware platform plus software. The software includes a machine-readable instruction, stored in a non-volatile storage medium. Therefore, each instance may be implemented in a form of a software product.

In each embodiment, the hardware may be implemented by dedicated hardware or hardware executing the machine-readable instruction. For example, the hardware may be a specially designed permanent circuit or logical device (for example, a dedicated processor such as a field programmable gate array (FPGA) or an application-specific integrated circuits (ASIC)) configured to perform a particular operation. The hardware may alternatively include a programmable logical device or circuit (for example, including a general processor or another programmable processor) configured temporarily by software and configured to perform a specific operation.

In addition, each embodiment of this application may be implemented by a data processing program executed by a data processing device such as a computer. Apparently, the data processing program constitutes this application. In addition, generally, the data processing program stored in a storage medium is executed by directly reading the program from the storage medium or by installing or copying the program to a storage device (such as a hard disk or memory) of the data processing device. Therefore, such storage medium also constitutes this application. This application further provides a non-volatile the storage medium. The non-volatile storage medium stores the data processing program. The data processing program may be configured to perform any one of the foregoing methods in this application.

The machine-readable instruction corresponding to the modules in FIG. 9 may enable an operating system and the like operating on the computer and the like to complete some or all of the operations described herein. The non-volatile computer-readable storage medium may be a memory inserted into an expansion board inserted in the computer or a memory written to an expansion unit connected to the computer. A central processing unit (CPU) or the like installed on the expansion board or the expansion unit may perform some and all actual operations according to an instruction.

The foregoing descriptions are merely preferred embodiments consistent with the present disclosure, but are not intended to limit this application. Any modification, equivalent replacement, improvement and the like made within the spirit and principle of this application shall fall within the protection scope of this application.

What is claimed is:

1. An image display method, performed by a terminal device, the method comprising:

receiving a data stream of the to-be-processed image transmitted by a server;

decoding the data stream to obtain decoded data;

overlaying the decoded data to a preset surface texture layer; and obtaining texture data from the surface texture layer, and using the texture data as image data of a to-be-processed image, the to-be-processed image comprising a first image and a second image spliced together by placing the first image and the second image adjacent to each other with an overlapping side, the first image and the second image having a same size, pixels in the second image having a one-to-one correspondence with pixels in the first image, color data of each pixel in the first image representing attributes of all color channels of a corresponding pixel in the to-be-processed image except a transparent attribute, and color data of each pixel in the second image representing the transparent attribute of the corresponding pixel in the first image;

obtaining color data of each pixel in the first image and the color data of each pixel in the second image from the to-be-processed image, comprising:

mapping the image data of the to-be-processed image overlaid to the surface texture layer to a preset range in a preset coordinate system, the preset range of the preset coordinate system is a normalized area universal for different to-be-processed images with different sizes, the preset coordinate system formed by a first axis parallel to the overlapping side of the first image and the second image and a second axis perpendicular to the overlapping side;

determining position data of each pixel in the first image within the preset range as first position data according to a mapping relationship between the to-be-processed image from the surface texture layer and the preset range of the preset coordinate system;

determining position data of the corresponding pixel in the second image within the preset range according to the first position data, and using the position data as second position data, wherein a first coordinate of a pixel in the second image along the first axis is the same as a first coordinate of the corresponding pixel in the first image, a second coordinate of the pixel in the second image along the second axis equals a sum of a fixed value and a second coordinate of the corresponding pixel in the first image, the fixed value being universal for different to-be-processed images with different sizes; and obtaining the color data of each pixel in the first image from the preset range according to the first position data and obtaining the color data of each pixel in the second image from the preset range according to the second position data;

generating a third image according to the color data of each pixel in the first image and the color data of each pixel in the second image, pixels in the third image having a one-to-one correspondence with the pixels in the first image, and color data of each pixel in the third image being based on the color data of the corresponding pixel in the first image and the color data of the corresponding pixel in the second image; and displaying the third image.

2. The method according to claim 1, wherein a difference between a maximum horizontal coordinate and a minimum horizontal coordinate in the preset range is a, and a difference between a maximum vertical coordinate and a minimum vertical coordinate is b; the first image and the second image are spliced side by side, and the first image is on a left side of the second image; and a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is a/2.

3. The method according to claim 1, wherein a difference between a maximum horizontal coordinate and a minimum horizontal coordinate in the preset range is a, and a difference between a maximum vertical coordinate and a minimum vertical coordinate is b;

the first image and the second image are spliced side by side, and the first image is on a right side of the second image; and a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is −a/2.

4. The method according to claim 1, wherein a difference between a maximum horizontal coordinate and a minimum horizontal coordinate in the preset range is a, and a difference between a maximum vertical coordinate and a minimum vertical coordinate is b; and the first image and the second image are spliced up and down, and the first image is below the second image; and a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is b/2.

5. The method according to claim 1, wherein a difference between a maximum horizontal coordinate and a minimum horizontal coordinate in the preset range is a, and a difference between a maximum vertical coordinate and a minimum vertical coordinate is b; and the first image and the second image are spliced up and down, and the first image is above the second image; and a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is −b/2.

6. The method according to claim 1, wherein the obtaining color data of each pixel in the first image from the preset range comprises: obtaining the color data of each pixel in the first image from the preset range by using a sampler; and
the obtaining color data of each pixel in the second image from the preset range comprises: obtaining the color data of each pixel in the second image from the preset range by using the sampler.

7. The method according to claim 1, wherein the color data of each pixel in the first image includes components of all color channels of the pixel; the color data of each pixel in the second image is a color value of the pixel; and the color data of each pixel in the third image is a color vector of the pixel; and the generating a third image comprises combining the components of all color channels of each pixel in the first image with a color value of the corresponding pixel in the second image to form the color vector of the corresponding pixel in the third image.

8. The method according to claim 1, the method further comprising:
obtaining a preset fourth image, and displaying the fourth image on a display interface, wherein the fourth image is on a lower layer of the third image.

9. The method according to claim 1, wherein overlaying the decoded data to a preset surface texture layer comprises:
drawing the decoded data to an intermediate layer between a decoding layer and a display layer to obtain the to-be-processed image, the intermediate layer being the preset surface texture layer not for directly direct display.

10. The method according to claim 1, wherein a coordinate of a pixel in the first image mapped from the surface texture layer to the preset range in the preset coordinate system textureCoordinateRGB is obtained by:

textureCoordinateRGB=vec2
((textureTransform*vTexCoordinate).x,(texture Transform*vTexCoordinate).y), where vec2 means a two dimensional coordinate, vTexCoordinate is a coordinate of the pixel in the first image in the surface texture layer, textureTransform is a transformation matrix for mapping of the to-be-processed image from the surface texture layer to the preset range in the preset coordinate system.

11. The method according to claim 1, wherein an absolute value of the fixed value is half of a difference value between a minimum coordinate and a maximum coordinate along the second axis.

12. A non-transitory computer-readable storage medium, storing a computer program, and when executed by one or more processors, the computer program implements an image display method, comprising:
receiving a data stream of the to-be-processed image transmitted by a server;
decoding the data stream to obtain decoded data;
overlaying the decoded data to a preset surface texture layer; and
obtaining texture data from the surface texture layer, and using the texture data as image data of a to-be-processed image, the to-be-processed image comprising a first image and a second image spliced together by placing the first image and the second image adjacent to each other with an overlapping side, the first image and the second image having a same size, pixels in the second image having a one-to-one correspondence with pixels in the first image, color data of each pixel in the first image representing attributes of all color channels of a corresponding pixel in the to-be-processed image except a transparent attribute, and color data of each pixel in the second image representing the transparent attribute of the corresponding pixel in the first image;
obtaining color data of each pixel in the first image and the color data of each pixel in the second image from the to-be-processed image, comprising:
mapping the image data of the to-be-processed image overlaid to the surface texture layer to a preset range in a preset coordinate system, the preset range of the preset coordinate system is a normalized area universal for different to-be-processed images with different sizes, the preset coordinate system formed by a first axis parallel to the overlapping side of the first image and the second image and a second axis perpendicular to the overlapping side;
determining position data of each pixel in the first image within the preset range as first position data according to a mapping relationship between the to-be-processed image from the surface texture layer and the preset range of the preset coordinate system;
determining position data of the corresponding pixel in the second image within the preset range according to the first position data, and using the position data as second position data, wherein a first coordinate of a pixel in the second image along the first axis is the same as a first coordinate of the corresponding pixel in the first image, a second coordinate of the pixel in the second image along the second axis equals a sum of a fixed value and a second coordinate of the corresponding pixel in the first image, the fixed value being universal for different to-be-processed images with different sizes; and
obtaining the color data of each pixel in the first image from the preset range according to the first position data and obtaining the color data of each pixel in the second image from the preset range according to the second position data;
generating a third image according to the color data of each pixel in the first image and the color data of each pixel in the second image, pixels in the third image having a one-to-one correspondence with the pixels in the first image, and color data of each pixel in the third image being based on the color data of the corresponding pixel in the first image and the color data of the corresponding pixel in the second image; and
displaying the third image.

13. The computer-readable storage medium of claim 12, wherein a difference between a maximum horizontal coordinate and a minimum horizontal coordinate in the preset range is a, and a difference between a maximum vertical coordinate and a minimum vertical coordinate is b; the first image and the second image are spliced side by side, and the first image is on a left side of the second image; and
a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is a/2.

14. The computer-readable storage medium of claim 12, wherein a difference between a maximum horizontal coordinate and a minimum horizontal coordinate in the preset range is a, and a difference between a maximum vertical coordinate and a minimum vertical coordinate is b;

the first image and the second image are spliced side by side, and the first image is on a right side of the second image; and a vertical coordinate of each pixel in the second image within the preset range is the same as a vertical coordinate of the corresponding pixel in the first image within the preset range, and a difference between a horizontal coordinate of each pixel in the second image within the preset range and a horizontal coordinate of the corresponding pixel in the first image within the preset range is −a/2.

15. The computer-readable storage medium of claim 12, wherein a difference between a maximum horizontal coordinate and a minimum horizontal coordinate in the preset range is a, and a difference between a maximum vertical coordinate and a minimum vertical coordinate is b; and the first image and the second image are spliced up and down, and the first image is below the second image; and a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is b/2.

16. The computer-readable storage medium of claim 12, wherein a difference between a maximum horizontal coordinate and a minimum horizontal coordinate in the preset range is a, and a difference between a maximum vertical coordinate and a minimum vertical coordinate is b; and the first image and the second image are spliced up and down, and the first image is above the second image; and a horizontal coordinate of each pixel in the second image within the preset range is the same as a horizontal coordinate of the corresponding pixel in the first image within the preset range, and a difference between a vertical coordinate of each pixel in the second image within the preset range and a vertical coordinate of the corresponding pixel in the first image within the preset range is −b/2.

17. The computer-readable storage medium of claim 12, wherein the obtaining color data of each pixel in the first image from the preset range comprises:

obtaining the color data of each pixel in the first image from the preset range by using a sampler; and the obtaining color data of each pixel in the second image from the preset range comprises: obtaining the color data of each pixel in the second image from the preset range by using the sampler.

18. An image display apparatus, comprising: a memory storing computer instructions; and a processor coupled to the memory and configured to execute the computer instructions to perform:

receiving a data stream of the to-be-processed image transmitted by a server;

decoding the data stream to obtain decoded data;

overlaying the decoded data to a preset surface texture layer; and obtaining texture data from the surface texture layer, and using the texture data as image data of a to-be-processed image, the to-be-processed image comprising a first image and a second image spliced together by placing the first image and the second image adjacent to each other with an overlapping side, the first image and the second image having a same size, pixels in the second image having a one-to-one correspondence with pixels in the first image, color data of each pixel in the first image representing attributes of all color channels of a corresponding pixel in the to-be-processed image except a transparent attribute, and color data of each pixel in the second image representing the transparent attribute of the corresponding pixel in the first image;

obtaining color data of each pixel in the first image and the color data of each pixel in the second image from the to-be-processed image, comprising:

mapping the image data of the to-be-processed image overlaid to the surface texture layer to a preset range in a preset coordinate system, the preset range of the preset coordinate system is a normalized area universal for different to-be-processed images with different sizes, the preset coordinate system formed by a first axis parallel to the overlapping side of the first image and the second image and a second axis perpendicular to the overlapping side;

determining position data of each pixel in the first image within the preset range as first position data according to a mapping relationship between the to-be-processed image from the surface texture layer and the preset range of the preset coordinate system;

determining position data of the corresponding pixel in the second image within the preset range according to the first position data, and using the position data as second position data, wherein a first coordinate of a pixel in the second image along the first axis is the same as a first coordinate of the corresponding pixel in the first image, a second coordinate of the pixel in the second image along the second axis equals a sum of a fixed value and a second coordinate of the corresponding pixel in the first image, the fixed value being universal for different to-be-processed images with different sizes; and obtaining the color data of each pixel in the first image from the preset range according to the first position data and obtaining the color data of each pixel in the second image from the preset range according to the second position data;

generating a third image according to the color data of each pixel in the first image and the color data of each pixel in the second image, pixels in the third image having a one-to-one correspondence with the pixels in the first image, and color data of each pixel in the third image being based on the color data of the corresponding pixel in the first image and the color data of the corresponding pixel in the second image; and displaying the third image.

* * * * *